US011520622B2

(12) United States Patent
Huchachar et al.

(10) Patent No.: US 11,520,622 B2
(45) Date of Patent: Dec. 6, 2022

(54) ACTIVE QUEUE MANAGEMENT IN A MULTI-NODE COMPUTING ENVIRONMENT

(71) Applicant: ServiceNow, Inc., Santa Clara, CA (US)

(72) Inventors: Gurucharan Huchachar, San Diego, CA (US); Kyle James Barron-Kraus, Columbus, OH (US)

(73) Assignee: ServiceNow, Inc., Santa Clara, CA (US)

( * ) Notice: Subject to any disclaimer, the term of this patent is extended or adjusted under 35 U.S.C. 154(b) by 374 days.

(21) Appl. No.: 16/552,362

(22) Filed: Aug. 27, 2019

(65) Prior Publication Data

US 2020/0348968 A1 Nov. 5, 2020

Related U.S. Application Data

(63) Continuation of application No. 62/842,825, filed on May 3, 2019.

(51) Int. Cl.
*G06F 9/46* (2006.01)
*G06F 9/48* (2006.01)
*G06F 9/4401* (2018.01)

(52) U.S. Cl.
CPC .......... *G06F 9/4881* (2013.01); *G06F 9/4418* (2013.01); *G06F 2209/5011* (2013.01); *G06F 2209/5018* (2013.01)

(58) Field of Classification Search
None
See application file for complete search history.

(56) References Cited

U.S. PATENT DOCUMENTS

| 5,978,594 | A | 11/1999 | Bonnell |
| 6,321,229 | B1 | 11/2001 | Goldman |
| 6,609,122 | B1 | 8/2003 | Ensor |
| 6,748,593 | B1 * | 6/2004 | Brenner ............... G06F 9/5083 709/223 |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |
| 7,028,301 | B2 | 4/2006 | Ding |
| 7,062,683 | B2 | 6/2006 | Warpenburg |
| 7,131,037 | B1 | 10/2006 | LeFaive |

(Continued)

*Primary Examiner* — Bing Zhao
(74) *Attorney, Agent, or Firm* — Fletcher Yoder PC

(57) ABSTRACT

Systems and methods for processing computing jobs of a managed network are disclosed. Each of one or more worker nodes may implement a scheduler thread and a pool of worker threads. Upon waking up from a sleep state, the scheduler thread may determine a current number of jobs in an in-memory job queue that are waiting for processing by a worker thread, and may compute a job-completion rate of jobs processed by threads of the pool. Based on the job-completion rate, the scheduler thread may perform one or more of retrieving more jobs from a centralized database job queue and adding them to the in-memory job queue; removing one or more jobs from the in-memory job queue and returning them to the database job queue; leaving the in-memory job queue unchanged; or adjusting the duration of the sleep-interval timer. The scheduler thread may then return to a sleep state.

19 Claims, 10 Drawing Sheets

(56) References Cited

U.S. PATENT DOCUMENTS

| | | | |
|---|---|---|---|
| 7,137,117 B2 * | 11/2006 | Ginsberg | G06F 1/329 718/102 |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Non | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,877,783 B1 | 1/2011 | Cline | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Meuller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Meuller | |
| 9,654,473 B2 | 5/2017 | Miller | |
| 9,727,522 B1 * | 8/2017 | Barber | G06F 9/5016 |
| 9,766,935 B2 | 9/2017 | Kelkar | |
| 9,792,387 B2 | 10/2017 | George | |
| 9,805,322 B2 | 10/2017 | Kelkar | |
| 10,320,761 B2 | 6/2019 | Barron-Kraus | |
| 2010/0275207 A1 * | 10/2010 | Radmilac | G06F 11/3466 718/101 |
| 2014/0047140 A1 * | 2/2014 | Otenko | G06F 9/5027 710/54 |

* cited by examiner

ACTIVE QUEUE MANAGEMENT IN A MULTI-NODE COMPUTING ENVIRONMENT

CROSS-REFERENCE TO RELATED APPLICATIONS

This application claims priority under 35 U.S.C. § 119(e) to U.S. Provisional Patent Application Ser. No. 62/842,825, filed on May 3, 2019, which is incorporated herein in its entirety by reference.

BACKGROUND

Managed networks may include various types of computer networks that can be remotely administered. This management may involve one or more computing devices disposed within a remote network management platform collecting information about the configuration and operational states of software applications executing on behalf on the managed network, and then presenting representations of this information by way of one or more user interfaces. The user interfaces may be, for instance, web-based user interfaces. In some instances, remote management of networks may be provided by a third party, such as a service provider or vendor.

Network management, including remote network management, may involve numerous processes carried out autonomously, semi-autonomously with human interaction, and manually through user actions. Network management processes may support network operations, such as infrastructure and performance monitoring, maintenance, and problem/issue detection and resolution. For example, a network management process may be a "problem management process" used to enable reporting of a network issue/problem, such as unavailability of a server or loss of connectivity, to IT personnel, and then to guide or direct actions towards a resolution according to a predetermined workflow or trouble-shooting flow chart.

A managed network itself may also support the mission and operations of an organization or enterprise, and the mission and operations may also involve autonomous, semi-autonomous, and manual processes. For example, a "problem" in a supply chain process of a manufacturing enterprise might be an unexpected interruption in a component supply, and the enterprise might have a problem management process in place for reporting and resolving such a problem.

SUMMARY

In accordance with example embodiments, remote network management of a managed network may be implemented by a "computational instance" or "customer instance" of a remote network management platform. A computational instance may include various physical and/or virtual servers, databases, and other computing resources that may be dedicated or assigned to managing a network of an organization or enterprise. A computational instance may also include various ready-made network management tasks and services, as well as facilities for customizing tasks and services, for example. The remote management platform may be owned and/or operated by a service provider, which may provide computational instances to organizations or enterprises on a subscription basis, for example. In some deployments, an organization or enterprise may have more than one computational instance.

Over the course of network operations and management of a managed network, numerous application programs, services, computing tasks, and the like, may be executed by various computing devices, servers, and/or databases, among other infrastructure components, of the managed network and/or of a computational instance associated with the managed network. Non-limiting examples of such applications programs, tasks, and services may include application programs for monitoring network performance, analysis programs for providing diagnostics related to network performance, service programs that are responsive to web-based user requests, database processing tasks, enterprise-specific services and tasks, such as processing sales information, and processing customer service tasks. These are just a few of types of computing tasks and applications that may be part of routine, day-to-day operations, or possibly non-routine operations of remote network management.

In order to help ensure that tasks, service, and applications are afforded necessary and timely computing resources, processing may be distributed among various computing devices, servers, and other physical and/or virtual processing entities of a computational instance and/or managed network. For example, tasks and applications that entail processing may include or be made up of component processing "jobs" that may be "farmed out" to various available computing and/or processing resources for processing in the background or foreground.

In accordance with example embodiments, a server device may receive requests for processing of various jobs, and distribute them among multiple worker "nodes" that are configured for carrying out job processing in the background or foreground. Each given worker node may host a pool of worker threads that then do the actual job processing of jobs acquired by or assigned to the given worker node. In an example embodiment, each worker node may implement a scheduler thread that obtains jobs from a centralized job queue, and then distributes them in some way to the worker threads of the worker node.

Efficient distributed processing of jobs of a managed network may therefore entail appropriate design considerations for how jobs are made available for processing by worker nodes, how worker nodes obtain the available jobs, and how nodes distribute obtained jobs among their worker threads. Conventional approaches to this process may not account for dynamic aspects of job processing by distributed nodes. For example, a scheduler thread may periodically or episodically obtain a fixed number of jobs from a central job queue, regardless of how fast or slow its worker threads are keeping up. This may result in uneven distribution of processing among the total processing power available across all worker nodes and worker thread.

The inventors have recognized that proper accounting of dynamic operating conditions of each worker node and its threads can significantly improve balancing of job processing across worker nodes and worker threads, and lead to efficient processing of computing jobs of a managed network. The inventors have devised techniques for adjusting the frequency with which a scheduler thread obtains jobs, as well as the number of job it obtains at any given time, based at least in part on its assessment of current conditions and progress of job processing by the worker node.

Accordingly, a first example embodiment may involve a computing device configured for processing computing jobs of a managed network that is associated with a computational instance of a remote network management platform, the computing device comprising: one or more processors; and memory storing computer-readable instructions that, when executed by the one or more processors, cause the computing device to carry out operations of at least a scheduler thread and a pool of worker threads, the operations including: causing the scheduler thread to wake up from a current sleep state upon expiration of a sleep-interval timer, the sleep-interval timer having a duration; after waking up, the scheduler thread determining a current number of jobs in an in-memory job queue in the memory that are waiting for processing by a worker thread of the pool; based at least in part on the current number of jobs in the in-memory job queue, the scheduler thread computing, over a current sliding time-window of a width including the current sleep state, a job-completion rate of jobs processed by the pool of worker threads; based on the computed job-completion rate, the scheduler thread performing at least one of four scheduling tasks, the four scheduling tasks being: (i) retrieving one or more jobs from a database job queue of the computational instance and adding the one or more retrieved jobs to the in-memory job queue, (ii) removing one or more jobs from the in-memory job queue and returning the one or more removed jobs to the database job queue, (iii) leaving the in-memory job queue unchanged, or (iv) adjusting the duration of the sleep-interval timer; and causing the scheduler thread to transition to a new sleep-state for the duration of the sleep-interval timer.

In a second example embodiment may involve a system configured for processing computing jobs of a managed network that is associated with a computational instance of a remote network management platform, the computing system comprising: a database job queue disposed within the computational instance and configured for queuing the jobs of the managed network; a server device configured to receive requests from one or more computing devices of the managed network for processing of computing jobs, and enqueue the computing jobs in the database job queue; and a plurality of worker nodes of the computational instance, each being comprised in a computing device; wherein each of the plurality of worker nodes is configured to carry out respective operations of at least a respective scheduler thread and a respective pool of worker threads, the respective operations including: causing the respective scheduler thread to wake up from a respective current sleep state upon expiration of a respective sleep-interval timer, the respective sleep-interval timer having a respective duration; after waking up, the respective scheduler thread determining a respective current number of jobs in a respective in-memory job queue that are waiting for processing by a worker thread of the respective pool; based at least in part on the respective current number of jobs in the respective in-memory job queue, the respective scheduler thread computing, over a respective, current sliding time-window of a width including the respective current sleep state, a respective job-completion rate of jobs processed by the respective pool of worker threads; based on the computed respective job-completion rate, the respective scheduler thread performing at least one of four scheduling tasks, the four scheduling tasks being: (i) retrieving one or more jobs from the database job queue and adding the one or more retrieved jobs to the respective in-memory job queue, (ii) removing one or more jobs from the respective in-memory job queue and returning the one or more removed jobs to the database job queue, (iii) leaving the respective in-memory job queue unchanged, or (iv) adjusting the respective duration of the respective sleep-interval timer; and causing the respective scheduler thread to transition to a new, respective sleep state for the respective duration of the respective sleep interval.

In a third example embodiment may involve a method for processing computing jobs of a managed network that is associated with a computational instance of a remote network management platform, the method carried out by a computing device of the computational instance, and comprising: implementing a scheduler thread and a pool worker threads; causing the scheduler thread to wake up from a current sleep state upon expiration of a sleep-interval timer, the sleep-interval timer having a duration; after waking up, the scheduler thread determining a current number of jobs in an in-memory job queue in the memory that are waiting for processing by a worker thread of the pool; based at least in part on the current number of jobs in the in-memory job queue, the scheduler thread computing, over a current sliding time-window of a width including the current sleep state, a job-completion rate of jobs processed by the pool of worker threads; based on the computed job-completion rate, the scheduler thread performing at least one of four scheduling tasks, the four scheduling tasks being: (i) retrieving one or more jobs from a database job queue of the computational instance and adding the one or more retrieved jobs to the in-memory job queue, (ii) removing one or more jobs from the in-memory job queue and returning the one or more removed jobs to the database job queue, (iii) leaving the in-memory job queue unchanged, or (iv) adjusting the duration of the sleep-interval timer; and causing the scheduler thread to transition to a new sleep state for the duration of the sleep interval timer.

In a fourth example embodiment, a system may include various means for carrying out each of the operations of the third example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
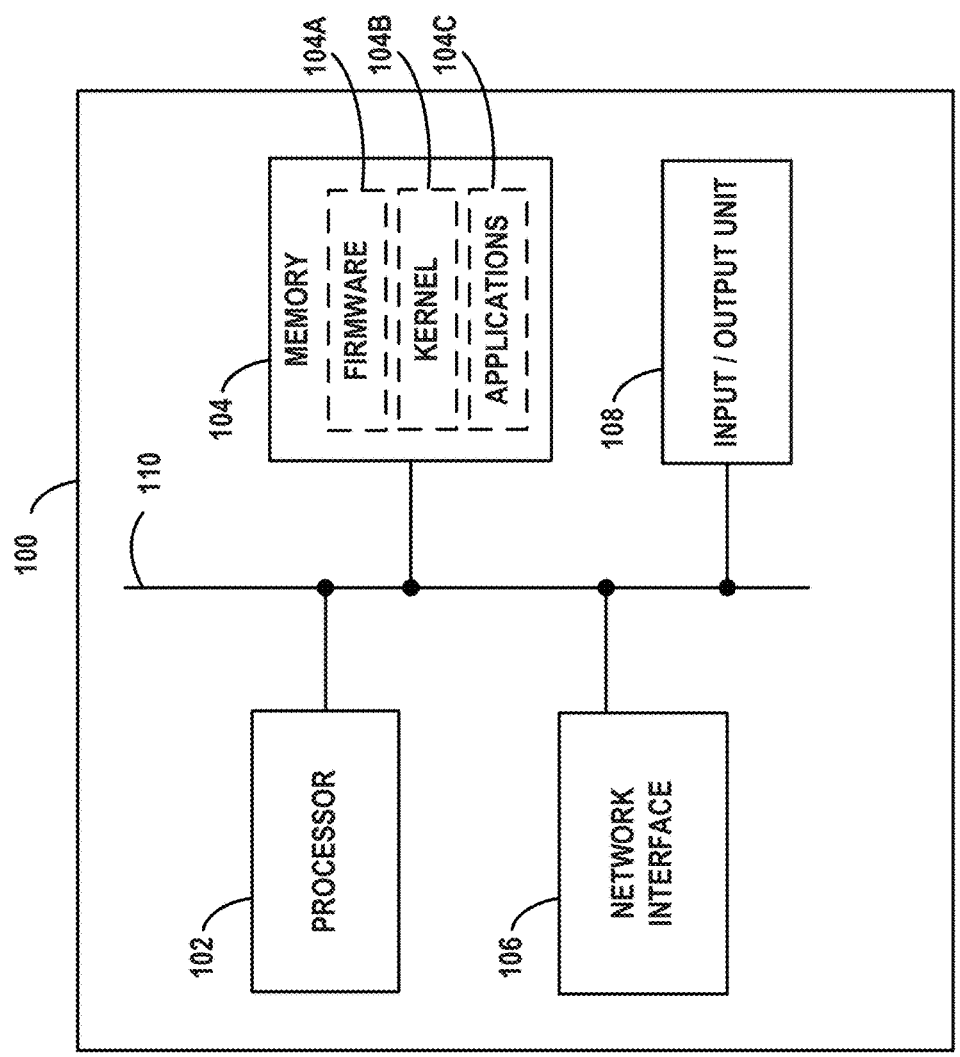
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
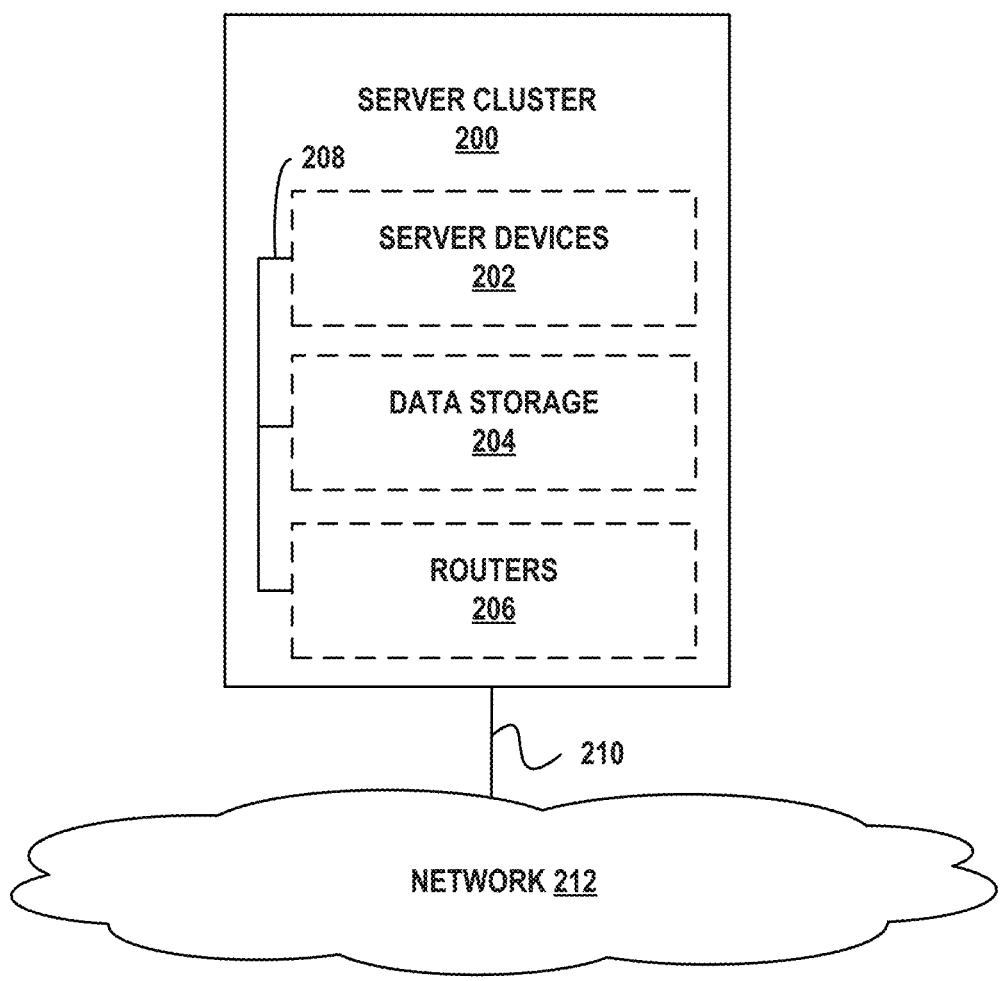
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
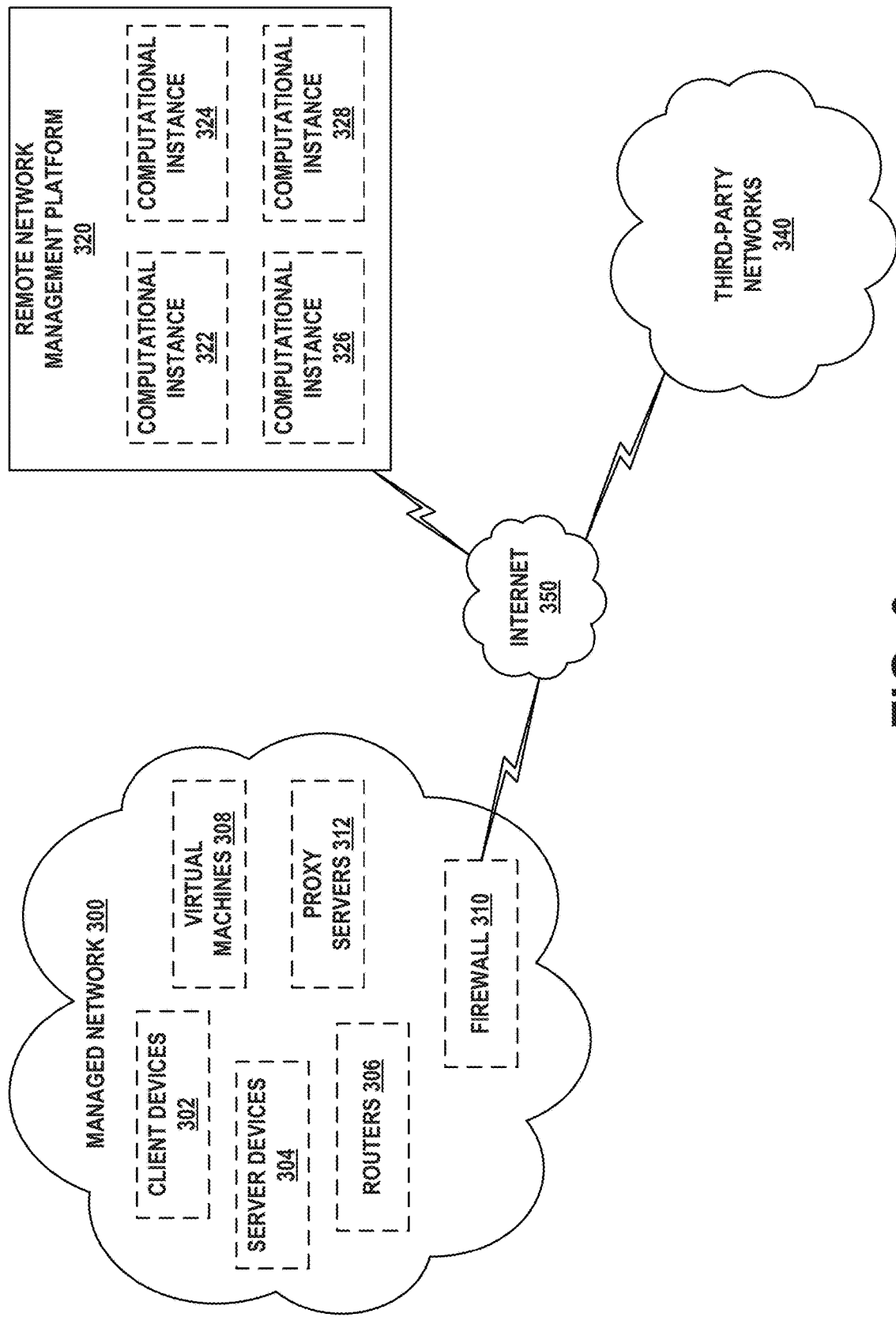
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
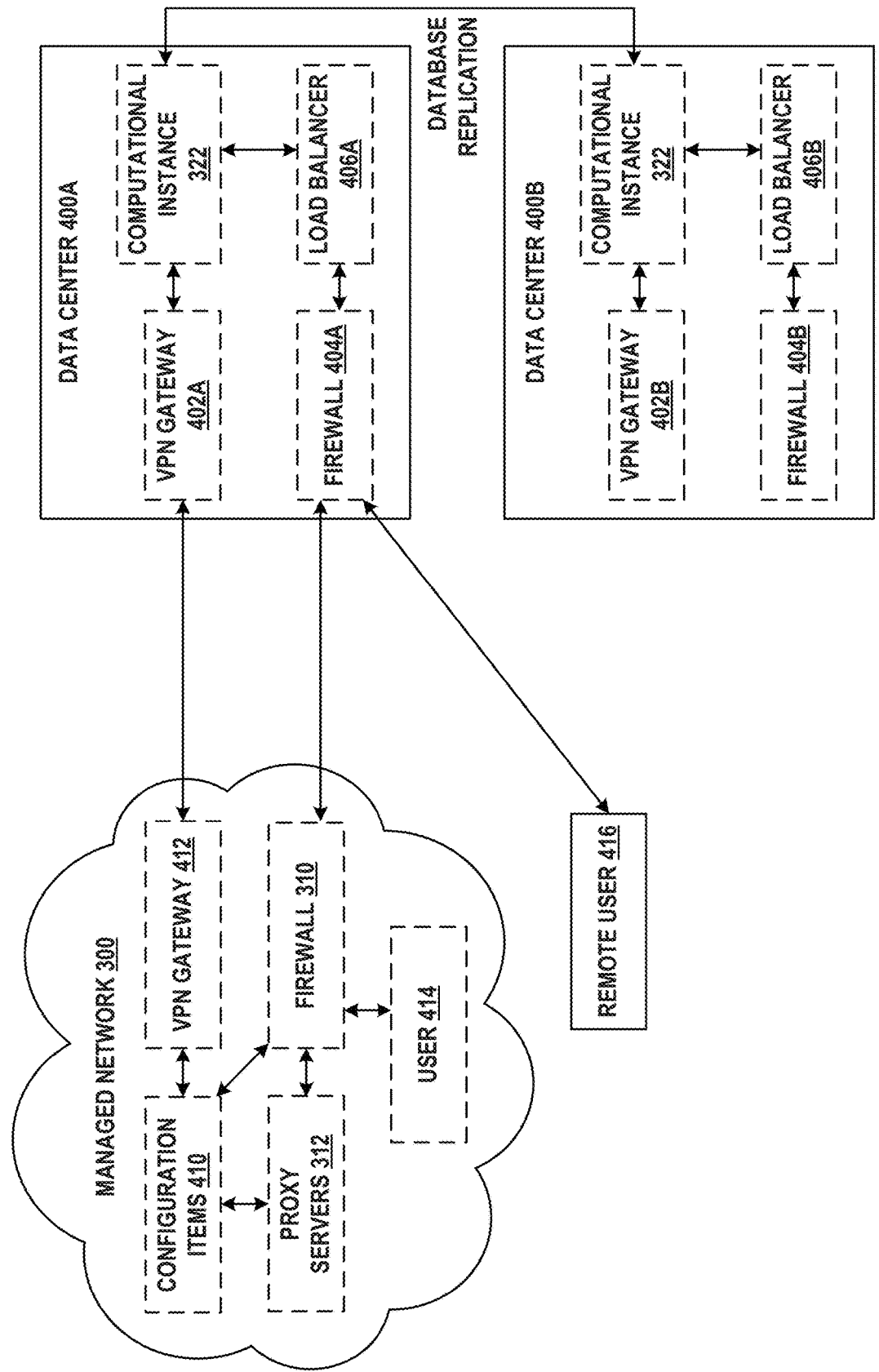
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-

10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
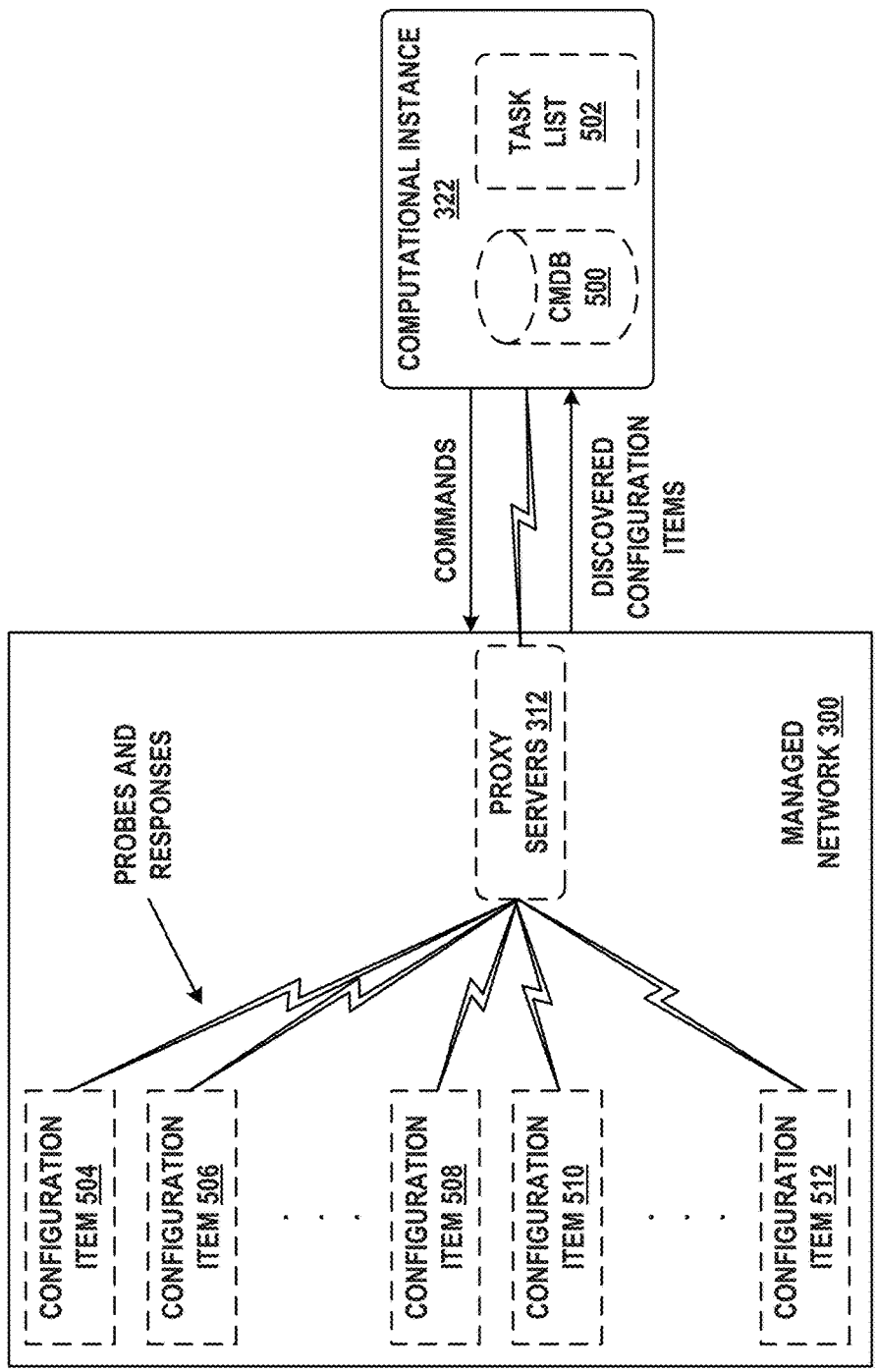
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
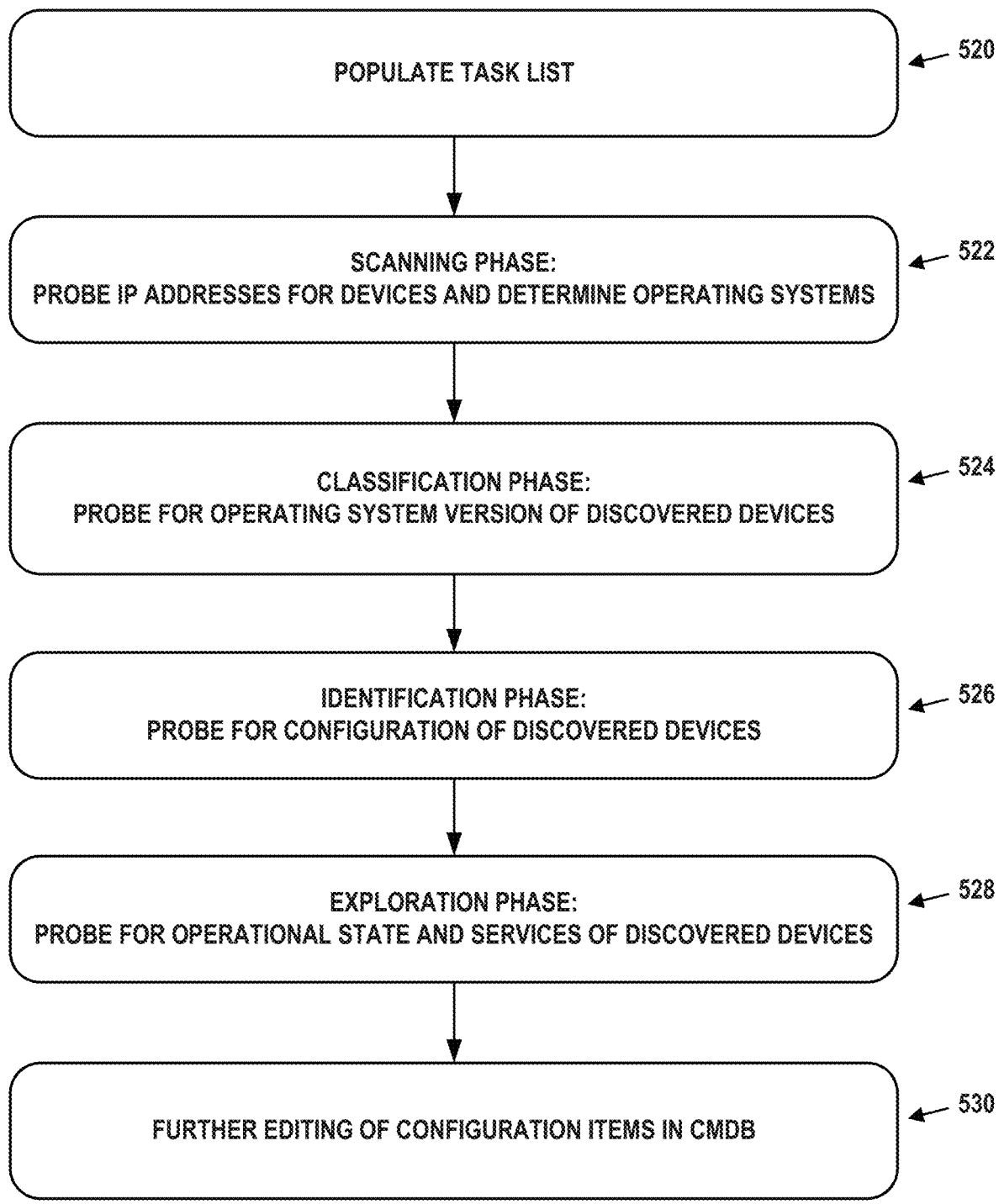
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE ARCHITECTURE AND OPERATION OF ACTIVE QUEUE MANAGEMENT IN A MULTI-NODE COMPUTING ENVIRONMENT

As mentioned above, an enterprise or organization, and or a managed network that supports it, may typically generate numerous processing jobs during the course of operations. These jobs may be generated directly by various computer devices in the managed network or in a computational instance. They may also be generated as part of a service or application program that runs or is invoked as the result of, or in service of, a service request from a client device or other requesting source for example. In general, there can be a wide variety of computing jobs generated by a wide variety of original or derived sources in a managed network and/or a computational instance. Example embodiments of architecture and operation of systems and methods for processing of computing jobs in distributed manner is described below.

In accordance with example embodiments, active queue management in a multi-node computing environment may be used for distributed processing of computing jobs. An example system may include a database job queue for queuing jobs that need to be processed, and multiple worker nodes that obtain or claim jobs from the database job queue and then process the jobs and provide the results to an appropriate entity, such as a server that may be coordinating job and/or processing requests. Each worker node may include an in-memory queue for queuing jobs obtained from the database job queue. Each worker node may also implement a scheduler thread that periodically and/or episodically wakes up from a sleep state in order to assess progress of jobs that are being processed, as well as the occupancy of the in-queue memory, in order to determine if it should try to claim additional jobs, and if so, how many. The scheduler thread may further adjust how long it should sleep the next time it enters a sleep state. It can also determine if it should return or release some jobs from the in-memory queue to the database job queue if progress has been too slow, such as below some threshold job-completion rate. The worker node may also include a pool of worker threads that do the actual job process, each taking one job at a time from the in-memory queue and providing processing results when processing of a give job is complete.

Figure 6:
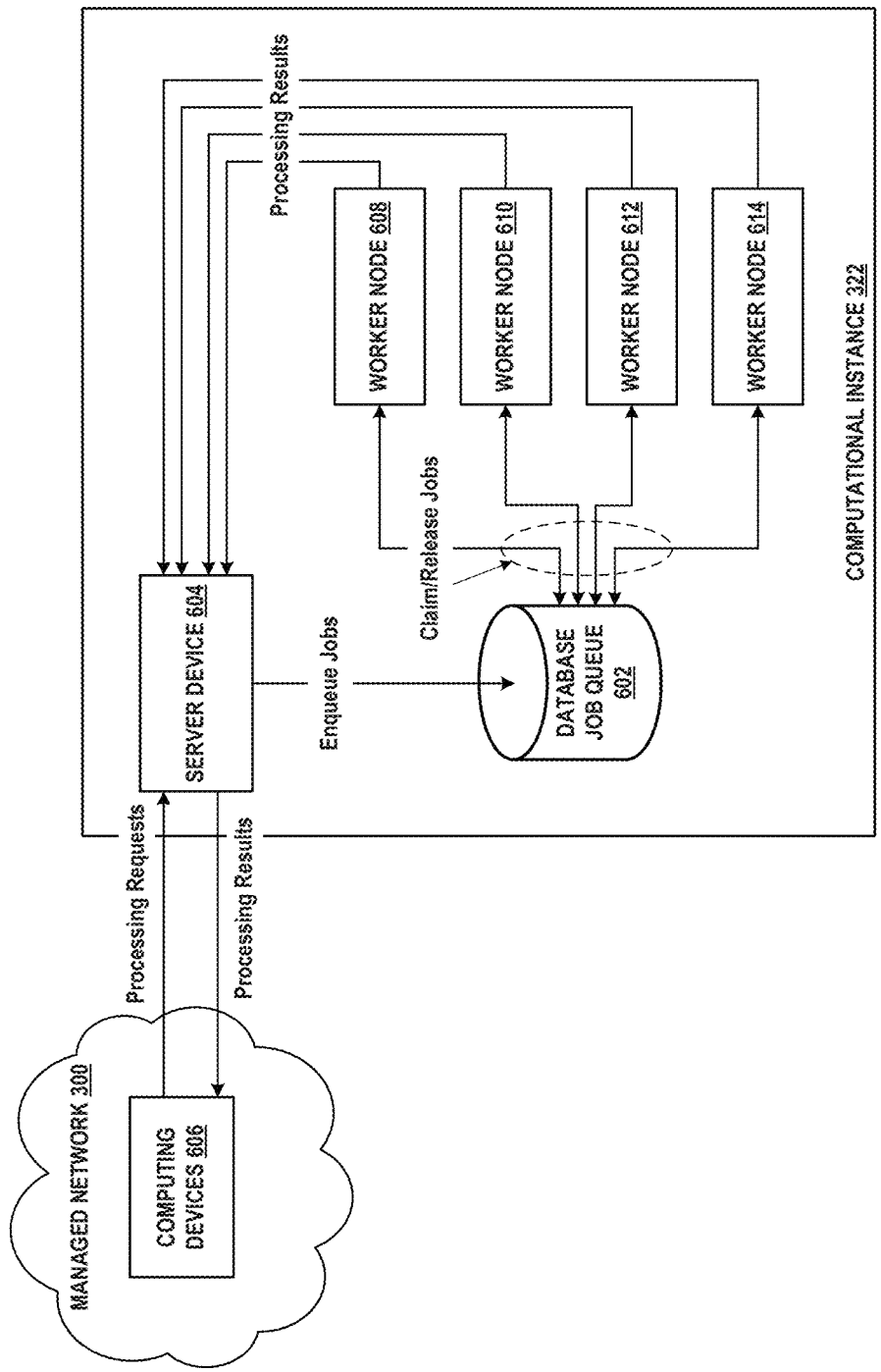
FIG. 6 depicts an example architecture of a system for processing computing jobs using active queue management in a multi-node computing environment, in accordance with example embodiments.

FIG. 6 depicts an example architecture of a system for processing computing jobs using active queue management in a multi-node computing environment, in accordance with example embodiments. As shown, a managed network 300 may include computing devices 606, which may represent various devices, entities, and/or components of the managed network as illustrated in FIG. 3. Examples include client devices 302, server devices 304, routers 306, and so on. In the course of operations, these devices may generate numerous computing jobs, or may be the source of requests or processing tasks that result in computing jobs that may be processed by a system of worker nodes.

FIG. 6 also depicts a computational instance 322 that includes, by way of example, a server 604, a database job queue 602, and worker nodes 608, 610, 612, and 614. There could be more or fewer worker nodes. As shown, processing requests are sent from the computing devices 606 to the server 604, which then enqueues computing jobs in the database job queue 602. It will be appreciated that processing requests or other operations beside those that originate in the managed network could also generate computing jobs. Further, there may be other devices besides the server 604 that receives processing requests or that determines and/or creates computing jobs, or the need for computing jobs, that are enqueued in the database job queue 602. Thus, in some sense, the server 604 in FIG. 6 may be seen as representing a centralized or partially-centralized process for creating, generating, and/or aggregating computing jobs that are entered into a database job queue for distributed processing.

Continuing with FIG. 6, the worker nodes 608, 610, 612, and 614 may access the database job queue 602 to obtain jobs for local processing on each worker node. In accordance with example embodiments, each worker node may access the database job queue 602 on a mutually exclusive basis in order to ensure proper synchronicity of operations on the common database job queue 602. For example, each worker node may use a MUTEX when accessing the database job queue 602. As shown, a worker node may access the database job queue to either claim a job for processing or to return an unprocessed job. As described below, a worker node may return an unprocessed job if it determines at some point that the waiting time for processing on the worker node is too long, or if the worker node is overloaded.

In an example embodiment, each worker node provides processing results to the server device 604 for each job processing completion. There may be other ways for worker nodes to provide processing results to the entities that requested and/or are the beneficiaries of the results. In this sense, the depiction of each worker node providing results to the server device 604 may again be seen as representing a centralization or partial centralization of coordination of distributed processing.

In accordance with example embodiments, the database job queue 602 may include a table of job records. Each record may include an identifier to associate a job with a requestor or beneficiary of job-completion results, and/or to associate the job represented in the record with resources and/or information that enables a processing entity, such as processing thread or other form of executing code to carry out the requisite processing. In addition, each record may include a job state for tracking processing status and progress, as well as to specify whether the associate job has been claimed for processing by a worker node. Each record may also include a field or indicator of a priority for setting or biasing the order in which jobs are claimed by worker nodes for processing. In further accordance with example embodiments, when a worker node obtains or claims a job from the database job queue 606, it may not actually remove the associated record from the database, but rather, it may mark the job as "claimed" so that another worker node does not try to claim the job. This is also an example of why mutually-exclusive access may be needed.

While the example system of FIG. 6 depicts the server device 604, database job queue 602, and worker nodes 608, 610, 612, and 614 to be part of or included in the computational instance 322, any one or more of these components could be part of or included in some other portion of a remote network management system. For example, one or more worker nodes could be located in processing resources of the managed network 300. There could also be more than one server device participating in enqueuing jobs in the database job queue 602. Further, jobs could be enqueued by other devices besides a centralized server.

Figure 7:
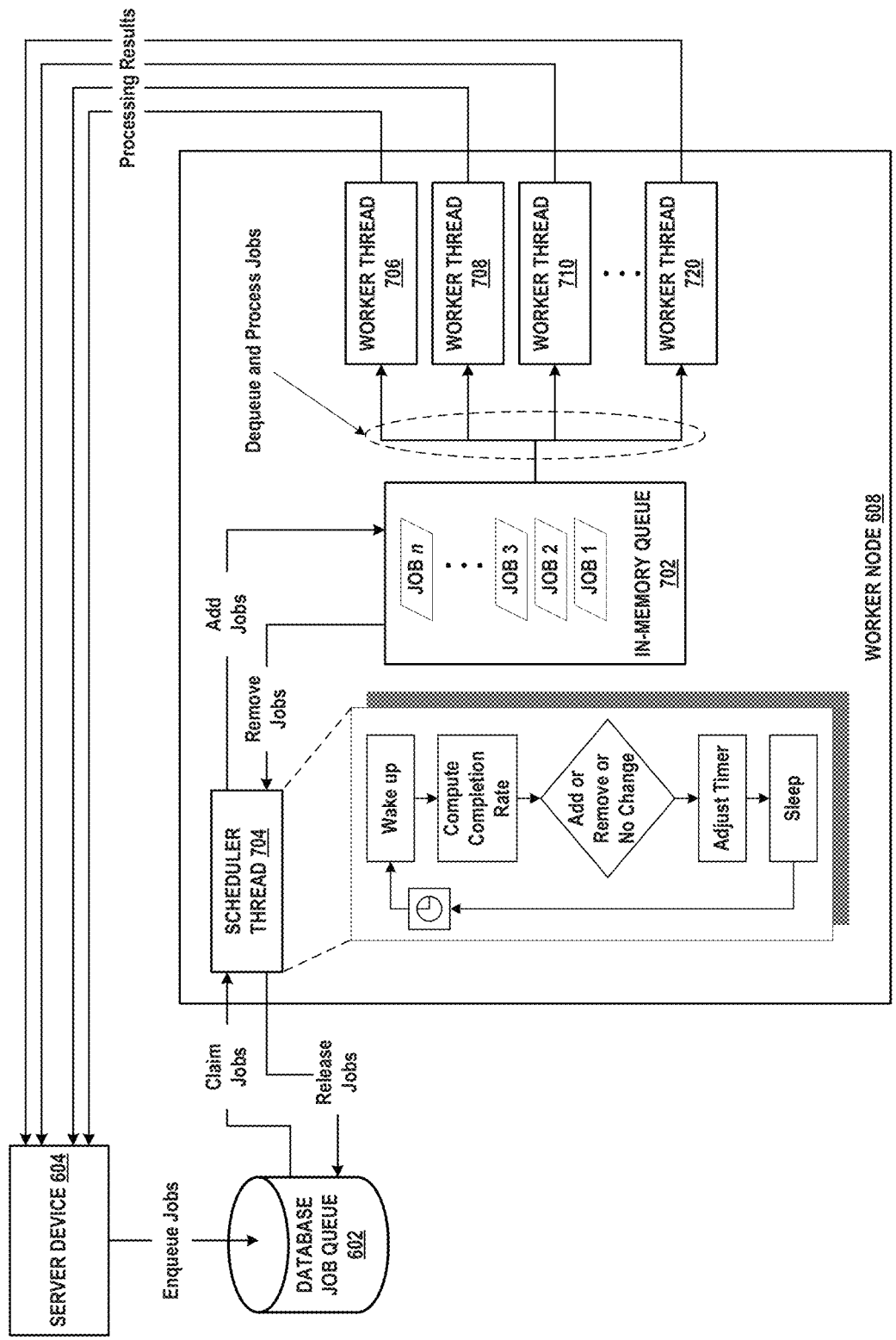
FIG. 7 depicts an example worker node of a system for processing computing jobs using active queue management in a multi-node computing environment, in accordance with example embodiments.

FIG. 7 depicts an example worker node 608 of a system for processing computing jobs using active queue management in a multi-node computing environment, in accordance with example embodiments. The example worker node 608 may be implemented on or by a physical or virtual computing device or server. For purposes of illustration, specific hardware components that may implement the worker node are omitted from the FIG. 7. It will be appreciated, however, that they may provide a structural basis for implementation of the worker node. In some embodiments, a computing device may itself be a worker node. In other embodiments, a worker node may be or represent an aspect of a computing device. Further, a physical or virtual computing device or resource may implement or host more than one worker node.

The example components of the worker node 608 illustrated may represent programmatic elements that may be implemented as executable instructions by one or more processors. Such instructions could be implemented as software, firmware, hardware, or some combination thereof. As shown in FIG. 7, the components of the worker node 608 include a scheduler thread 704, an in-memory queue 702, and worker threads 706, 708, 710, and 720. The vertical ellipses in the figure represent additional possible worker threads between 710 and 720. FIG. 7 also includes server device 604 and database job queue 602 for reference.

The in-memory queue may be a table or other data structure implemented in volatile or non-volatile memory of a physical or virtual computing device on which the worker node is implemented. In accordance with example embodiments, it may store records or other entries, each corresponding to a job waiting for processing by a worker thread of the worker node. Each record or entry may contain information and/or data that enables any given worker thread to carry out the processing of the associated job. Each job record or entry may also include a field or indicator of a priority for setting or biasing the order in which jobs are selected by worker threads for processing. The in-memory queue may be operated as a first-in-first-out (FIFO) basis, last-in-first-out (LIFO) basis, or some other basis, possibly involving the priority. The in-memory queue may be of fixed size or length, such that it has room for up to a fixed maximum number of job records or entries. Alternatively, it may have an adjustable size that may be set by the scheduler thread or other functional element of the worker node. Different worker nodes may have differently-sized in-memory queues, or may all have the same size in-memory queue.

Actions and operations carried out the by the scheduler thread 704 are represented in callout block of flowchart instructions below the scheduler thread. It will be appreciated that the instructions shown are meant to summarize operation in an abbreviated form. By way of example, operation of the scheduler thread entails waking up from a sleep state. Upon waking up, the scheduler thread computes a completion rate of jobs being processed by the worker threads since the last previous wake-up of the scheduler thread 704. Based on the determined completion rate, the scheduler thread adds jobs to the in-memory queue 702, removes jobs from the in-memory queue, or leaves the in-memory queue unchanged. The nature of the job-completion rate determination and the add/remove/unchanged operations are described in more detail below. After the add/remove/unchanged operation is carried out, the scheduler thread may adjust a sleep timer that sets the duration of the next sleep cycle. The scheduler thread then returns to a sleep state until the sleep time expires, again waking up the scheduler thread.

If the scheduler thread determines that jobs should be added to the in-memory queue, it accesses the database job queue 602, as described above, to claim one or more jobs, and then adds the jobs to the in-memory queue 602. This is indicated by the arrows from the database job queue to the scheduler thread, and from the scheduler thread to the in-memory queue. In accordance with example embodiments, the scheduler thread will add jobs if the job-completion rate is above an add threshold rate, and the number of jobs to claim for adding to the in-memory queue may also depend on the determined job-completion rate. In an example embodiment, the number of jobs to claim will increase with increasing job-completion rate above the add threshold, and decrease with decreasing job-completion rate above the add threshold.

If the scheduler thread determines that jobs should be removed from the in-memory queue, it removes one or more jobs and accesses the database job queue 602 to return or release the removed jobs, as also described above. This is indicated by the arrows from the in-memory job queue to the scheduler thread, and from the scheduler thread to the database job queue. In accordance with example embodiments, the scheduler thread will remove and return jobs if the job-completion rate is below a remove threshold rate, and the number of jobs to remove for returning to the database job queue may also depend on the determined job-completion rate. In an example embodiment, the number of jobs to remove and return will increase with decreasing job-completion rate below the remove threshold, and decrease with increasing job-completion rate below the remove threshold.

In accordance with example embodiments, the scheduler thread may also adjust the sleep timer based on the determined job-completion rate. In particular, if the rate is above a threshold, the scheduler thread may decrease the sleep timer duration. This will cause it to wake sooner from its next sleep state. Conversely, if the rate is below the same or a different threshold, the scheduler thread may increase the sleep timer duration. This will cause it to sleep longer on its next sleep state.

By adjusting the sleep timer as described, the scheduler thread may wake up more or less frequently based, at least in part, on the how quickly or slowly jobs are being processed by the worker threads. An example approach to this adjustment is discussed below. As noted above, however, in addition to (or as alternative to) periodic wake-ups, the scheduler thread may also wake up on an episodic basis. In accordance with example embodiments, the scheduler thread may be woken up from a sleep state before the sleep timer expires. There may be a variety of triggers that could result in an early wake-up. One example may be if the occupancy of the in-memory queue drops below a threshold value, and/or if the ratio of the occupancy of the in memory queue to the number of idle worker threads drops below a threshold value. These and similar situations may indicate that there is excess processing capacity among the worker threads relative to the number of jobs waiting in the in-memory queue, such that the scheduler thread should wake up early and try to claim more jobs. This helps ensure that processing capacity of the worker node is used efficiently and not underutilized, especially if there are jobs in the database job queue.

Another trigger for waking up a sleeping scheduler thread prior to expiration of the sleep timer may come from the database job queue, or a server that manages it, such as the server 604. In this situation, the database job queue may send a message to one or more scheduler threads of respective worker nodes to alert them of the availability of jobs. A received message may then cause the scheduler thread to wake up before its sleep timer expires, and try to claim one or more jobs from the database job queue. These two example circumstances, and other possible ones as well, help ensure that scheduler threads do not sleep "too much" when there are jobs to process and processing capacity available to process them.

In accordance with example embodiments, when a worker thread is idle and/or not processing another job, it will dequeue a job from the in-memory queue and process the job until it is complete. The worker thread may then provide processing results to the server device 604, as shown and as described above. Dequeuing is represented in the figure by the arrows pointing from the in-memory queue to the respective worker threads. In this manner, jobs added to the in-memory queue will be picked up by worker threads as the worker threads become available to process jobs.

Each time the scheduler wakes up, it examines the occupancy of the in-memory queue to determine the progress of job processing by the worker threads. In an example embodiment, the scheduler thread may make this determination by comparing the occupancy to occupancy determined during one or more previous wake-ups from previous sleep states. For example, the scheduler thread may compute and record a running average occupancy over a sliding time window, and during a current wake-up cycle, it may compare the current occupancy to the previously recorded running average. It may also update its running average using the current occupancy.

The scheduler thread could subtract the current occupancy of the in-memory queue from the running average occupancy. During a sleep state of the scheduler thread, only worker threads, as they complete job processing, will remove jobs from the in-memory queue. And since only the scheduler thread can add jobs to the in-memory queue, and it will not have done so during its most recent sleep state, the subtraction yields a difference that is greater than or equal to zero, and corresponds to the number of jobs completed during the last sleep state relative to the running average. Thus, dividing the difference from the subtraction by the width of the sliding time window yields a job-completion rate. The computed job-completion rate may therefore also be greater than or equal to zero, and will be in direct proportion to the difference from the subtraction.

By way of example, the sliding time window may be 5 minutes wide, and scheduler thread may wake up once per second. In this example, the window slides by one second for each new wake-up period of the scheduler thread. It will be appreciated that larger or smaller time windows could be used, and/or longer or shorter sleep interval durations could be used. Further, either or both could be adjusted according to the computed job-completion rate.

In accordance with example embodiments, the scheduler thread may add or remove jobs to/from the in-memory queue depending, at least in part, on the size of the job-completion rate. It may also adjust the sleep timer depending on the computed job-completion rate. In an example embodiment, the scheduler thread may use a number of threshold rates to define ranges that correspond to different actions regarding adding/removing jobs and/or adjusting the sleep timer duration. In an example embodiment, four threshold rates may be used. If the computed job-completion rate above a first threshold, the scheduler thread may add jobs. If the computed rate is above a second threshold, and the second threshold is greater than the first threshold, the scheduler thread may additionally adjust the sleep timer duration downward (i.e., decrease it). If the computed rate is greater than a third threshold and less than the first threshold, where the first threshold is greater than the third threshold, the scheduler thread may leave the in-memory queue unchanged. If the computed rate is less than the third threshold, the scheduler thread may increase the duration of the sleep timer interval. Finally, if the computed rate is less than a fourth threshold, where the fourth threshold is less than the third threshold, the scheduler thread may additionally remove one or more jobs from the in-memory queue and return or release them to the database job queue.

In further accordance with the example embodiment, the number of jobs added may depend on where the computed rate falls in the range above the first threshold. Similarly, the amount of decrease of the sleep timer duration may depend on where the computed rate falls in the range above the second threshold. The amount of increase of the sleep timer duration may depend on where the computed rate falls in the range below the third threshold. And the number of jobs removed from the in-memory queue may depend on where the compute rate falls in the range below the fourth threshold. It will be appreciated that other schemes for determining how many jobs to add/remove and/or how to adjust the sleep timer interval may be used as well.

By adding or releasing jobs from the in-memory queue based on computed and evaluated job-completion rate, the scheduler thread may dynamically adjust how the worker node participates in distributed job processing so as to do so efficiently with respect to its worker threads, and with respect to other worker nodes. This approach provides a significant improvement over approaches that claim a fixed number of jobs each time a scheduler wakes up, and a fixed sleep time duration.

Figure 8:
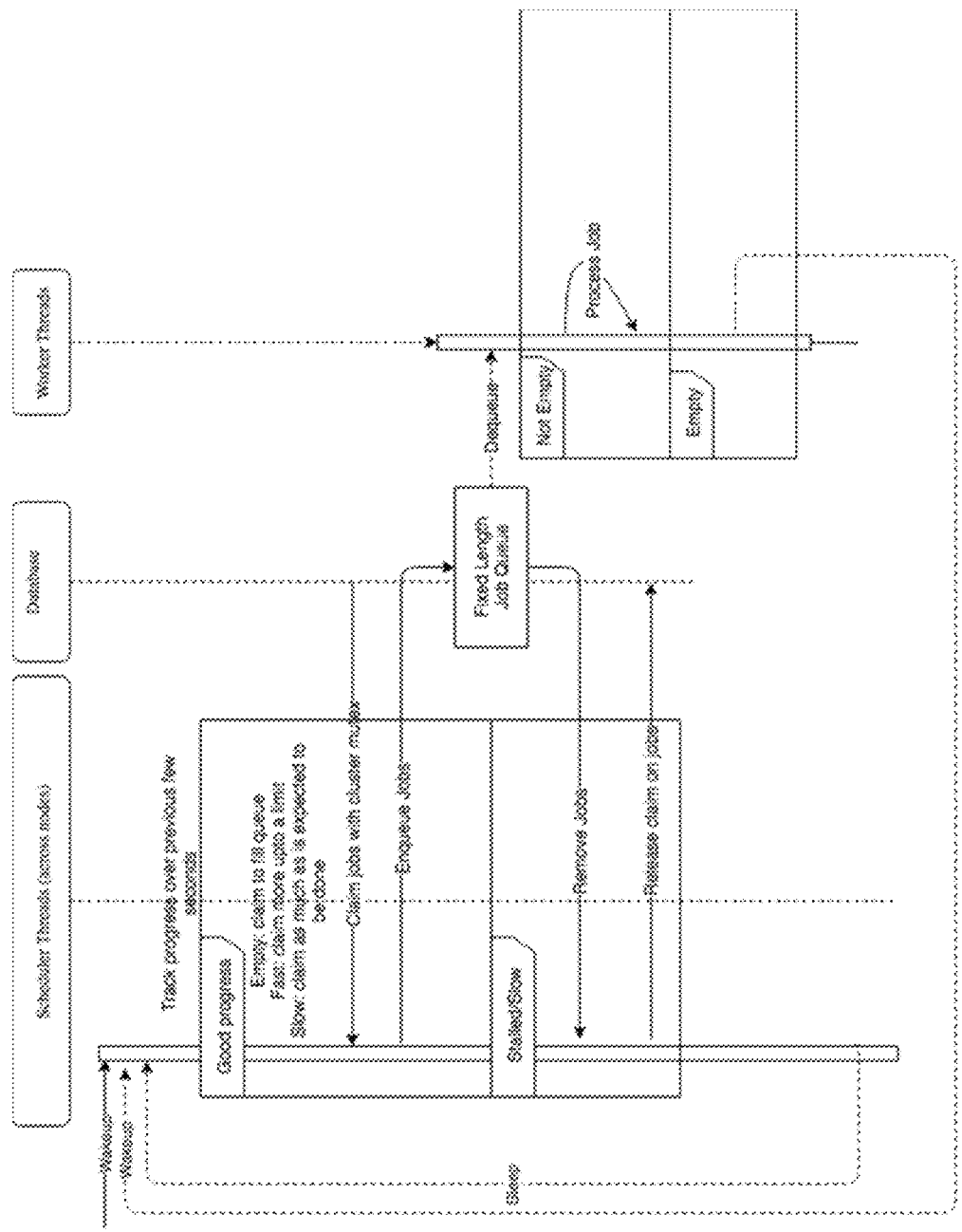
FIG. 8 is an example timing diagram of processing computing jobs using active queue management in a multi-node computing environment, in accordance with example embodiments.

FIG. 8 is an example timing diagram of processing computing jobs using active queue management in a multi-node computing environment, in accordance with example embodiments. As shown, the scheduler thread wakes up on a worker node and assesses job-completion progress. It then accesses the database job queue with a MUTEX and adds or returns jobs. When returning jobs, it releases them back to the database job queue. Each worker thread checks the in-memory queue and dequeues any available job for processing.

VI. EXAMPLE METHODS

Figure 9:
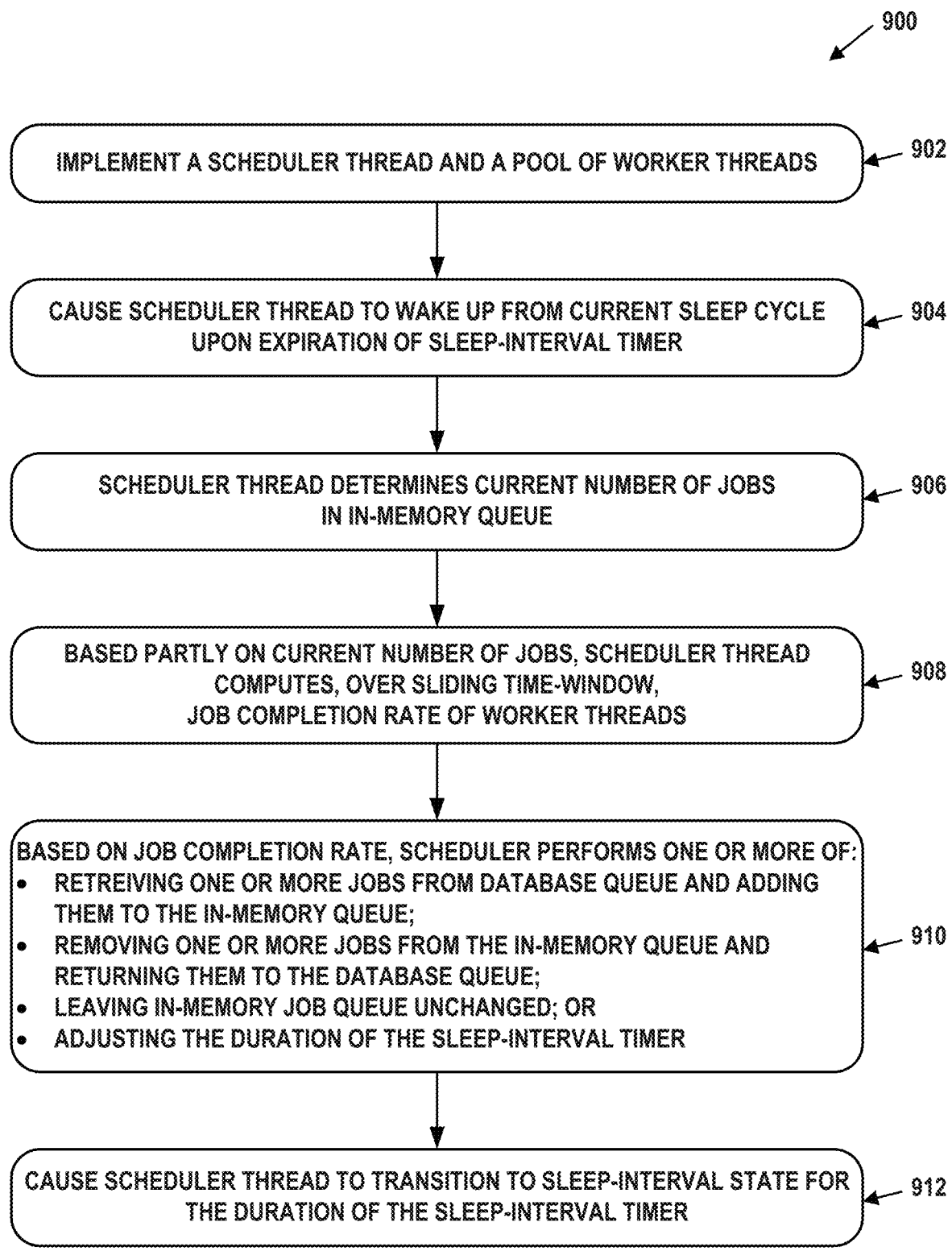
FIG. 9 is a flow chart, in accordance with example embodiments.

FIG. 9 is a flow chart illustrating an example embodiment of a method 900. The method illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. In an example embodiment, the method illustrated in FIG. 9 may be carried out by a computing device disposed within a computational instance, such as instance 322, of a remote network management platform, such as platform 320, which remotely manages a managed network, such as network 300.

Further, the example method 900 may be implemented and/or executed by more than one computing device or server. For example, while method 900 may describe actions and operations carried out by a computing device of a computational instance, the example method may also involve actions and operations of a server device and one or more databases as well. Additionally, the example method may be carried out by multiple worker nodes, each of which may be implemented on a computing device or server. And a single computing device or server may host more than one worker node that is carrying out the example method 900.

The embodiments of FIG. 9 may be simplified by the removal of any one or more of the features shown therein. Further, these embodiments may be combined with features, aspects, and/or implementations of any of the previous figures or otherwise described herein.

The method 900 may be carried out in a system for active queue management in a multi-node computing environment. The system may include a database job queue disposed within the computational instance and configured for queuing the jobs of the managed network, a server device configured to receive requests from one or more computing devices of the managed network for processing of computing jobs, and enqueue the computing jobs in the database job queue, and a plurality of worker nodes of the computational instance, each being comprised in a computing device. As noted, more than one worker node may be implemented or hosted on a single computing device or server. The system may also include one or more server devices disposed within the computational instance and configured to carry out various operations of the example method.

The example method 900 may also be embodied as instructions executable by one or more processors of the one or more server devices of the system. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the example method.

For purposes of illustration, the various steps and operations are described below in the context of a computing device, with a focus on the role of a worker node implemented on the computing device. It will be appreciated that the example method 900 may also involve actions and operations of other worker nodes, as well as other computing devices, servers, and databases. Such operations may be described as well.

Block 902 of example method 900 may involve implementing a scheduler thread and a pool worker threads on a computing device.

Block 904 may involve causing the scheduler thread to wake up from a current sleep state upon expiration of a sleep-interval timer. For example, the sleep-interval timer may have a fixed or adjustable duration.

Block 906 may involve the scheduler thread, after waking up, determining a current number of jobs in an in-memory job queue in the memory that are waiting for processing by a worker thread of the pool. The in-memory queue may thus reside in the memory of the computing device on which the scheduler thread is implemented.

Block 908 may involve the scheduler thread computing, over a current sliding time-window of a width including the current sleep state, a job-completion rate of jobs processed by the pool of worker threads. The determination may be based at least in part on the current number of jobs in the in-memory job queue.

Block 910 may involve the scheduler thread performing one or more of four scheduling tasks, based on the computed job-completion rate. The four scheduling tasks may include: (i) retrieving one or more jobs from a database job queue of the computational instance and adding the one or more retrieved jobs to the in-memory job queue, (ii) removing one or more jobs from the in-memory job queue and returning the one or more removed jobs to the database job queue, (iii) leaving the in-memory job queue unchanged, or (iv) adjusting the duration of the sleep-interval timer.

Finally, block 912 may involve causing the scheduler thread to transition to a new sleep state for the duration of the sleep interval timer. The duration of the sleep interval timer may or may not be adjusted with respect to the duration of the current sleep state from which the scheduler thread woke up from in the operation described in block 904.

In accordance with example embodiments, the method 900 may further entail one or more worker threads of the pool dequeuing a job from the in-memory job queue, and then processing the dequeued job or jobs. The processing of any particular job may be specific to the particular job, and the results of the processing may be directed to a server or other device that requested or required the particular job. For example, an application running on a client device in the managed network may issue a service request to a server in the computational instance. Fulfilling the service request may involve one or more computer processing tasks or jobs to be performed, and the server may thus enqueue the one or more computer processing jobs in the database job queue. The one or more worker threads may process the one or more jobs and return the results to the server, which may then complete or fulfil the initial service request. Other scenarios of worker thread process of computer processing jobs are possible as well.

In accordance with example embodiments, computing the job-completion rate over the current sliding time-window may entail computing a current running average number of jobs in the in-memory job queue over the current sliding time-window, and subtracting the current running average number of jobs from a previous running average number of jobs computed over a previous sliding time-window. The result of the subtraction may then be divided by the width of the current sliding time-window.

In accordance with example embodiments, the scheduler thread performing one or more of the four scheduling tasks based on the computed job-completion rate may entail increasing how many and/or how often jobs are retrieved from the database job queue and added to the in-memory queue as the job-completion rate increases. Alternatively, it may entail decreasing how many and/or how often jobs are retrieved from the database job queue and added to the in-memory queue as the job-completion rate decreases. There may be various computational algorithms for implementing these job-completion-rate-dependent actions.

In an example embodiment, the scheduler thread performing one or more of the four scheduling tasks based on the computed job-completion rate may involve comparing the job-completion rate to various threshold rates. In a particular example, four threshold rates may be used. Specifically, if the job-completion rate is greater than or equal to a first threshold rate, the scheduler thread may retrieve one or more jobs from the database job queue of the computational instance and add the one or more retrieved jobs to the in-memory job queue. If the job-completion rate is greater than or equal to a second threshold rate, where the second threshold rate is greater than the first threshold rate, the scheduler thread may retrieve one or more jobs from the database job queue of the computational instance and add the one or more retrieved jobs to the in-memory job queue, and decrease the duration of the sleep-interval timer. If the job-completion rate is greater than or equal to a third threshold rate and less than the first threshold rate, where the third threshold rate is less than the first threshold rate, the scheduler thread may leave the in-memory job queue unchanged. If the job-completion rate is less than the third threshold rate, the scheduler thread may increase the duration of the sleep-interval timer. And if the job-completion rate is less than a fourth threshold rate, where the fourth threshold rate is less than the third threshold rate, the scheduler thread may increase the duration of the sleep-interval timer, and remove one or more jobs from the in-memory job queue and returning the one or more removed jobs to the database job queue.

In accordance with example embodiments, the database job queue may include a table of job records, where each record corresponds to a respective job, and each job record includes data fields for marking a job identifier and job state, wherein the job state is at least one of: claimed/unclaimed, running or complete. For this arrangement, retrieving the one or more jobs from the database job queue may entail the scheduler thread gaining exclusive access to the database job queue, identifying a job record having claimed/unclaimed marked unclaimed, updating the identified job record to have claimed/unclaimed marked claimed, and relinquishing exclusive access to the database job queue. Gaining exclusive access may entail using a MUTEX or other mechanism for making access exclusive.

In accordance with example embodiments, returning the one or more removed jobs to the database job queue may entail the scheduler thread gaining exclusive access to the database job queue, identifying a particular job record having a job identifier corresponding to a job to be returned, updating the identified particular job record to have claimed/unclaimed marked unclaimed, and relinquishing exclusive access to the database job queue.

In accordance with example embodiments, the server device may be configured to receive requests from one or more computing devices of the managed network for processing of computing jobs, and to responsively enqueue the computing jobs in the database job queue. One or more worker nodes may then access the database job queue as described above, in order to distribute processing of the jobs in the database job queue across the one or more worker nodes, and among the plurality of worker threads on each worker node.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing device configured for processing computing jobs of a managed network that is associated with a computational instance of a remote network management platform, the computing device comprising:
   one or more processors; and
   memory storing computer-readable instructions that, when executed by the one or more processors, cause the computing device to carry out operations of at least a scheduler thread and a pool of worker threads, the operations including:
      enqueuing the computing jobs in a database job queue;
      causing the scheduler thread to wake up from a current sleep state upon expiration of a sleep-interval timer, the sleep-interval timer having a duration;
      after waking up, the scheduler thread determining a current number of jobs in an in-memory job queue in the memory that are waiting for processing by a worker thread of the pool;
      based at least in part on the current number of jobs in the in-memory job queue, the scheduler thread computing, over a current sliding time-window of a width including the current sleep state, a job-completion rate of jobs processed by the pool of worker threads;
      in response to an increase in the job-completion rate, selectively increasing, by the scheduler thread, one or both of: (i) how many or (ii) how often jobs are retrieved from the database job queue and added to the in-memory job queue selected based on an amount of the increase in the job-completion rate;
      in response to a decrease in the job-completion rate, selectively decreasing, by the scheduler thread, one or both of: (iii) how many or (iv) how often jobs are retrieved from the database job queue and added to the in-memory job queue selected based on an amount of the decrease in the job-completion rate; and
      causing the scheduler thread to transition to a new sleep-state for the duration of the sleep-interval timer.

2. The computing device of claim 1, wherein the operations further include:
at least one worker thread of the pool dequeuing a job from the in-memory job queue; and
the at least one worker thread processing the dequeued job.

3. The computing device of claim 1, wherein computing, over the current sliding time-window including the current sleep state, the job-completion rate of jobs processed by the pool of worker threads comprises:
computing a current running average number of jobs in the in-memory job queue over the current sliding time-window;
subtracting the current running average number of jobs from a previous running average number of jobs computed over a previous sliding time-window to determine a difference in number; and
dividing the difference in number by the width of the current sliding time-window.

4. The computing device of claim 1, wherein the scheduler thread is configured to:
if the job-completion rate is greater than or equal to a first threshold rate, retrieve the one or more jobs from the database job queue of the computational instance and add the one or more retrieved jobs to the in-memory job queue;
if the job-completion rate is greater than or equal to a second threshold rate, wherein the second threshold rate is greater than the first threshold rate, retrieve the one or more jobs from the database job queue of the computational instance and add the one or more retrieved jobs to the in-memory job queue, and decreasing the duration of the sleep-interval timer;
if the job-completion rate is greater than or equal to a third threshold rate and less than the first threshold rate, wherein the third threshold rate is less than the first threshold rate, leave the in-memory job queue unchanged;
if the job-completion rate is less than the third threshold rate, increase the duration of the sleep-interval timer; and
if the job-completion rate is less than a fourth threshold rate, wherein the fourth threshold rate is less than the third threshold rate, increase the duration of the sleep-interval timer, remove the one or more jobs from the in-memory job queue, and return the one or more removed jobs to the database job queue.

5. The computing device of claim 1, wherein the database job queue comprises a table of job records, each record corresponding to a respective job, and each job record including data fields for marking a job identifier and job state, wherein the job state is at least one of: claimed/unclaimed, running or complete,
and wherein retrieving the one or more jobs from the database job queue comprises:
gaining exclusive access to the database job queue;
identifying a job record having claimed/unclaimed marked unclaimed;
updating the identified job record to have claimed/unclaimed marked claimed; and
relinquishing exclusive access to the database job queue.

6. The computing device of claim 5, wherein returning the one or more removed jobs to the database job queue comprises:
gaining exclusive access to the database job queue;
identifying a particular job record having a job identifier corresponding to a job to be returned;
updating the identified particular job record to have claimed/unclaimed marked unclaimed; and
relinquishing exclusive access to the database job queue.

7. The computing device of claim 1, wherein, based on the job-completion rate and a set of threshold values organized in descending order, the scheduler thread performing at least one of four scheduling tasks, the four scheduling tasks being:
(i) decreasing the duration of the sleep-interval timer when the job-completion rate is greater than a first threshold value of the set;
(ii) retrieving the one or more jobs from the database job queue of the computational instance and adding the one or more retrieved jobs to the in-memory job queue when the job-completion rate is greater than a second threshold value of the set;
(iii) increasing the duration of the sleep-interval timer when the job-completion rate is less than a third threshold value of the set; and
(iv) removing the one or more jobs from the in-memory job queue and returning the one or more removed jobs to the database job queue when the job-completion rate is less than a fourth threshold value of the set.

8. A system configured for processing computing jobs of a managed network that is associated with a computational instance of a remote network management platform, the computing system comprising:
a database job queue disposed within the computational instance and configured for queuing the jobs of the managed network;
a server device configured to receive requests from one or more computing devices of the managed network for processing of computing jobs, and enqueue the computing jobs in the database job queue; and
a plurality of worker nodes of the computational instance, each being comprised in a computing device;
wherein each of the plurality of worker nodes is configured to carry out respective operations of at least a respective scheduler thread and a respective pool of worker threads, the respective operations including:
causing the respective scheduler thread to wake up from a respective current sleep state upon expiration of a respective sleep-interval timer, the respective sleep-interval timer having a respective duration;
after waking up, the respective scheduler thread determining a respective current number of jobs in a respective in-memory job queue that are waiting for processing by a worker thread of the respective pool;
based at least in part on the respective current number of jobs in the respective in-memory job queue, the respective scheduler thread computing, over a respective, current sliding time-window of a width including the respective current sleep state, a respective job-completion rate of jobs processed by the respective pool of worker threads;
in response to an increase in the respective job-completion rate, selectively increasing, by the respective scheduler thread, one or both of: (i) how many or (ii) how often jobs are retrieved from the database job queue and added to the respective in-memory job queue selected based on an amount of the increase in the respective job-completion rate;
in response to a decrease in the respective job-completion rate, selectively decreasing, by the respective scheduler thread, one or both of: (iii) how many or (iv) how often jobs are retrieved from the database job queue and added to the respective in-memory job queue selected based on an amount of the decrease in the respective job-completion rate; and causing the respective scheduler thread to transition to a new, respective sleep state for the respective duration of the respective sleep interval.

9. The system of claim 8, wherein the respective operations further include:

at least one respective worker thread of the respective pool dequeuing a job from the in-memory job queue; and the at least one respective worker thread processing the dequeued job.

10. The system of claim 8, wherein the respective scheduler thread computing the respective job-completion rate of jobs processed by the respective pool of worker threads comprises:

computing a respective current running average number of jobs in the respective in-memory job queue over the respective current sliding time-window;

subtracting the respective current running average number of jobs from a respective previous running average number of jobs computed over a respective previous sliding time-window to determine a respective difference in number; and dividing the respective difference in number by the respective width of the respective current sliding time-window.

11. The system of claim 8, wherein the database job queue comprises a table of job records, each record corresponding to a respective job, and each job record including data fields for marking a job identifier and job state, wherein the job state is at least one of: claimed/unclaimed, running or complete, and wherein the server device is configured to enqueue the computing jobs in the database job queue by:

adding a respective job record for each of the enqueued computing jobs; and marking each added respective job record as unclaimed.

12. The system of claim 11, wherein retrieving the one or more jobs from the database job queue comprises:

gaining exclusive access to the database job queue;

identifying a job record having claimed/unclaimed marked unclaimed;

updating the identified job record to have claimed/unclaimed marked claimed; and relinquishing exclusive access to the database job queue.

13. The system of claim 11, wherein returning the one or more removed jobs to the database job queue comprises:

gaining exclusive access to the database job queue;

identifying a particular job record having a job identifier corresponding to a job to be returned;

updating the identified particular job record to have claimed/unclaimed marked unclaimed; and relinquishing exclusive access to the database job queue.

14. The system of claim 8, wherein, based on the respective job-completion rate and a set of threshold values organized in descending order, the respective scheduler thread performing at least one of four scheduling tasks, the four scheduling tasks being:

(i) decreasing the duration of the respective sleep-interval timer when the respective job-completion rate is greater than a first threshold value of the set;

(ii) retrieving the one or more jobs from the database job queue of the computational instance and adding the one or more retrieved jobs to the respective in-memory job queue when the respective job-completion rate is greater than a second threshold value of the set;

(iii) increasing the duration of the respective sleep-interval timer when the respective job-completion rate is less than a third threshold value of the set; and (iv) removing the one or more jobs from the respective in-memory job queue and returning the one or more removed jobs to the database job queue when the respective job-completion rate is less than a fourth threshold value of the set.

15. A method for processing computing jobs of a managed network that is associated with a computational instance of a remote network management platform, the method carried out by a computing device of the computational instance, and comprising:

implementing a scheduler thread and a pool worker threads;

causing the scheduler thread to wake up from a current sleep state upon expiration of a sleep-interval timer, the sleep-interval timer having a duration;

after waking up, the scheduler thread determining a current number of jobs in an in-memory job queue in the memory that are waiting for processing by a worker thread of the pool;

based at least in part on the current number of jobs in the in-memory job queue, the scheduler thread computing, over a current sliding time-window of a width including the current sleep state, a job-completion rate of jobs processed by the pool of worker threads;

based on the job-completion rate and a set of threshold values organized in descending order, the scheduler thread performing at least one of four scheduling tasks, the four scheduling tasks being:

(i) decreasing the duration of the sleep-interval timer when the job-completion rate is greater than a first threshold value of the set, (ii) retrieving one or more jobs from a database job queue of the computational instance and adding the one or more retrieved jobs to the in-memory job queue when the job-completion rate is greater than a second threshold value of the set, (iii) increasing the duration of the sleep-interval timer when the job-completion rate is less than a third threshold value of the set, and (iv) removing one or more jobs from the in-memory job queue and returning the one or more removed jobs to the database job queue when the job-completion rate is less than a fourth threshold value of the set; and causing the scheduler thread to transition to a new sleep state for the duration of the sleep-interval timer.

16. The method of claim 15, further comprising:

at least one worker thread of the pool dequeuing a job from the in-memory job queue; and the at least one worker thread processing the dequeued job.

17. The method of claim 15, wherein computing, over the current sliding time-window including the current sleep state, a job-completion rate of jobs processed by the pool of worker threads comprises:

computing a current running average number of jobs in the in-memory job queue over the current sliding time-window;

subtracting the current running average number of jobs from a previous running average number of jobs computed over a previous sliding time-window to determine a difference in number; and dividing the difference in number by the width of the current sliding time-window.

18. The method of claim 15, wherein the scheduler thread performing at least one of the four scheduling tasks based on the job-completion rate comprises:
- increasing at least one of: (i) how many or (ii) how often jobs are retrieved from the database job queue and added to the in-memory job queue as the job-completion rate increases; and
- decreasing at least one of: (i) how many or (ii) how often jobs are retrieved from the database job queue and added to the in-memory job queue as the job-completion rate decreases.

19. The method of claim 15, wherein the database job queue comprises a table of job records, each record corresponding to a respective job, and each job record including data fields for marking a job identifier and job state, wherein the job state is at least one of: claimed/unclaimed, running or complete, wherein retrieving the one or more jobs from the database job queue comprises:

gaining exclusive access to the database job queue;

identifying a job record having claimed/unclaimed marked unclaimed;

updating the identified job record to have claimed/unclaimed marked claimed; and relinquishing exclusive access to the database job queue;

and wherein returning the one or more removed jobs to the database job queue comprises:

gaining exclusive access to the database job queue;

identifying a particular job record having a job identifier corresponding to a job to be returned;

updating the identified particular job record to have claimed/unclaimed marked unclaimed; and relinquishing exclusive access to the database job queue.

* * * * *